(12) United States Patent
Luo

(10) Patent No.: US 9,362,863 B2
(45) Date of Patent: Jun. 7, 2016

(54) BUILDING BODY WITH SOLAR TRACKING DEVICE

(71) Applicants: BIG SUN ENERGY TECHNOLOGY INCORPORATION, Hsinchu County (TW); Chia Ching Luo, Hsinchu County (TW)

(72) Inventor: Chia Ching Luo, Hsinchu County (TW)

(73) Assignees: Big Sun Energy Technology Incorporation, Hsinchu County (TW); Chia Ching Luo, Hsinchu County (TW)

( * ) Notice: Subject to any disclaimer, the term of this patent is extended or adjusted under 35 U.S.C. 154(b) by 0 days.

(21) Appl. No.: 14/793,938

(22) Filed: Jul. 8, 2015

(65) Prior Publication Data

US 2015/0311856 A1 Oct. 29, 2015

Related U.S. Application Data

(62) Division of application No. 14/162,927, filed on Jan. 24, 2014.

(30) Foreign Application Priority Data

Feb. 8, 2013 (TW) .............................. 102105235 A
Jul. 25, 2013 (TW) .............................. 102126631 A

(51) Int. Cl.
| | | |
|---|---|---|
| E04D 13/18 | (2014.01) | |
| H02S 20/24 | (2014.01) | |
| F24J 2/04 | (2006.01) | |
| F24J 2/38 | (2014.01) | |
| F24J 2/52 | (2006.01) | |
| F24J 2/54 | (2006.01) | |
| E04D 13/00 | (2006.01) | |

(52) U.S. Cl.
CPC ............... *H02S 20/24* (2014.12); *E04D 13/00* (2013.01); *F24J 2/045* (2013.01); *F24J 2/38* (2013.01); *F24J 2/5233* (2013.01); *F24J 2/5239* (2013.01); *F24J 2/5424* (2013.01); *H02S 20/32* (2014.12); *F24J 2002/5458* (2013.01); *Y02B 10/20* (2013.01); *Y02E 10/44* (2013.01); *Y02E 10/47* (2013.01)

(58) Field of Classification Search
CPC ......... Y02E 10/47; Y02B 10/10; Y02B 10/12
USPC ......... 52/173.3; 126/600, 601, 605–608, 621, 126/623; 136/243, 244; 250/203.1
See application file for complete search history.

(56) References Cited

U.S. PATENT DOCUMENTS

| | | | | |
|---|---|---|---|---|
| 6,663,498 B2 * | 12/2003 | Stipan | ................ | A63B 69/3652 108/7 |
| 8,046,961 B1 * | 11/2011 | Cutting | .................. | F24J 2/5232 206/510 |
| 8,735,713 B2 * | 5/2014 | Sie | .......................... | F24J 2/5417 126/600 |
| 2008/0308091 A1 * | 12/2008 | Corio | ..................... | F24J 5/5406 126/606 |

(Continued)

*Primary Examiner* — William Gilbert
(74) *Attorney, Agent, or Firm* — Rosenberg, Klein & Lee

(57) ABSTRACT

A building body with solar tracking device includes a top tent supported on the building body. The top tent includes at least one set of intersection section where multiple beams in different directions intersect each other. A support assembly of the solar tracking device is mounted on an upper side of the intersection section or in a position corresponding to the upper side of the intersection section. A solar generation module is mounted on the support assembly, whereby the top tent provides a sufficient strength for supporting the solar tracking device.

18 Claims, 17 Drawing Sheets

(56) References Cited

U.S. PATENT DOCUMENTS

2009/0199846 A1* 8/2009 Collins .................. F24J 2/405
126/601

2012/0073565 A1* 3/2012 Grant ...................... F24J 2/525
126/606
2013/0042856 A1* 2/2013 Switkes ................. F24J 2/5233
126/606

* cited by examiner

BUILDING BODY WITH SOLAR TRACKING DEVICE

REFERENCE TO RELATED APPLICATIONS

This application is being filed as a Divisional application of Ser. No. 14/162,927, filed 24 Jan. 2014, currently pending.

BACKGROUND OF THE INVENTION

1. Field of the Invention

The present invention relates generally to a building body with solar tracking device, and more particularly to a building body, which can provide a sufficient structural strength for supporting the solar tracking device.

2. Description of the Related Art

The natural energy resources normally utilized by humans, such as petroleum and coal have been gradually exhausted. Also, the traditional energy resources are likely to cause pollution. Therefore, in energy resource policy, all countries encourage peoples to research and develop green energy technique such as solar energy, wind power and other renewable energy. Through continuous effort in many years, various solar batteries have been more and more popularly applied in our daily life such as solar heater, solar alarm, solar lighthouse and outdoor information display/indication equipment. Also, solar panels are often used as spare power source in balance with civil power for some factories and barracks. All these can more and less make up a deficiency of traditional energy resource.

An early-stage solar panel is mounted on a predetermined fixed support or building in a fixed position by a fixed angle. The sunshine absorption angle of the solar panel is fixed and unadjustable. However, due to the rotation and revolution of the earth, the incidence of sunlight onto the solar panel is varied with the change of latitude, four seasons and even daily morning and afternoon time. Therefore, the solar panel with a fixed angle can hardly effectively absorb the incident sunlight so that the power generation efficiency of the solar panel is lowered. In order to solve this problem, various self-navigated solar tracking controllers have been developed to keep the solar panel facing the sun so as to enhance the power generation efficiency. Almost all these solar tracking devices necessitate a sufficiently rigid support assembly for secure installation. In addition, a cooperative precise transmission mechanism is needed to adjust the angle of the solar generation module. Moreover, in order to increase the total power generation capacity for wider application, the light collection area of the solar generation module must be considerably enlarged. Therefore, currently, the size of one single light collection area is generally up to several decades of square meters. As a result, the total volume of the solar generation module is huge and the weight of the solar generation module is up to several tons and is too heavy for a common building to bear. Furthermore, the enlarged light collection area is subject to push/press of outdoor airflow. Therefore, it is necessary to specially reinforce the support assembly and the base for supporting the support assembly. Accordingly, currently, the bottom face of the solar collector is generally directly attached to the building or a movable top tent and it has never been seen that the huge and heavy solar tracking device be directly mounted on the top tent of a building. The current large-scale solar generation equipment is still directly mounted on the ground. In this case, the land under the equipment cannot be utilized. This leads to waste of the land and space under the equipment and will directly affect the land cost for building the equipment. Therefore, it is not economic to build the conventional solar tracking device on the ground.

SUMMARY OF THE INVENTION

It is therefore a primary object of the present invention to provide a building body with solar tracking device. The building body has sufficient structural strength for a huge and heavy solar tracking device to directly mount on the building body. Therefore, not only the solar tracking device can be securely mounted on the building body, but also a safe and utilizable building space is formed under the top tent. Accordingly, the use of the solar tracking device is diversified to increase the added value.

To achieve the above and other objects, the building body with solar tracking device of the present invention includes at least one top tent. The top tent is at least supported by a peripheral structure of the building body. At least one set of beam structure is built on the peripheral structure to inward extend to the top tent. The beam structure is built with an intersection section where the beams in different directions intersect each other. The solar tracking device is mounted on the upper side of the intersection section of the beam structure or in a position corresponding to the upper side of the intersection section. Under such circumstance, the weight of the solar tracking device is uniformly distributed over every part of the top tent and the peripheral structure via the intersection section and the entire beam structure. Accordingly, the weight will not concentrate on a specific part of the top tent, where the solar tracking device is mounted to lead to damage.

In addition, the beam structure and the cooperative peripheral structure together define a safe and utilizable space under the top tent. The space is suitable for building a closed or not closed house. Therefore, the space (the ground) under the solar tracking device will not be wasted.

In the above building body, the solar tracking device is mounted on the intersection section of the beam structure as adjacent to the peripheral structure of the building body as possible, whereby the installation of the solar tracking device is facilitated.

In the above building body, a vertical column is additionally disposed under the intersection section between the intersection section and a next lower floorboard or the ground so as to increase the support strength of the intersection section and ensure safety of the entire equipment.

In the above building body, an accelerometer is used to detect the inclination direction and angle of the solar generation module so as to provide data for controlling and correcting the inclination of the solar generation module. In this case, the solar generation module can precisely keep in a true angle and direction according to the preset solar tracking parameters.

In the above building body, the solar tracking device includes: a support assembly, a support seat being disposed at one end of the support assembly; a carrier platform disposed on the support seat via a two-dimensionally movable pivot assembly, at least one solar generation module being disposed on the carrier platform for absorbing sunlight to generate power; at least one link apparatus disposed between the support assembly and the carrier platform, according to reference parameters previously stored in a control unit, the link apparatus driving the carrier platform to incline around the pivot assembly in different directions and angles; and a detection/correction module disposed on the carrier platform to detect various practical parameters such as inclination direction and angle of the carrier platform and feed back the practical parameters to the control unit for comparing the practical parameters with the previously stored reference parameters to obtain a comparison result, according to the comparison result, via the link apparatus, the detection/correction module correcting the inclination direction and angle of the carrier platform and the solar generation module.

In the above building body, two synchronously operable drive sections are disposed on the drive member. First ends of two connection members are respectively connected to the two drive sections in reverse directions, while second ends of the connection members are respectively connected to two opposite corners of the carrier platform corresponding to two sides of the support assembly.

In the above building body, the two drive sections are annular grooves formed on the drive member for two connection members to wind thereon in reverse directions.

In the above building body, the carrier platform has a polygonal shape. Two ends of the connection members are respectively connected to two opposite corners of the carrier platform.

In the above building body, the pivot assembly includes a pivot seat and a first and a second shaft rods passing through the pivot seat and intersecting each other. Two ends of the first shaft rod are disposed on the support seat, while two ends of the second shaft rod are disposed on the carrier platform.

The present invention can be best understood through the following description and accompanying drawings, wherein:

DETAILED DESCRIPTION OF THE PREFERRED EMBODIMENTS

Figure 1:
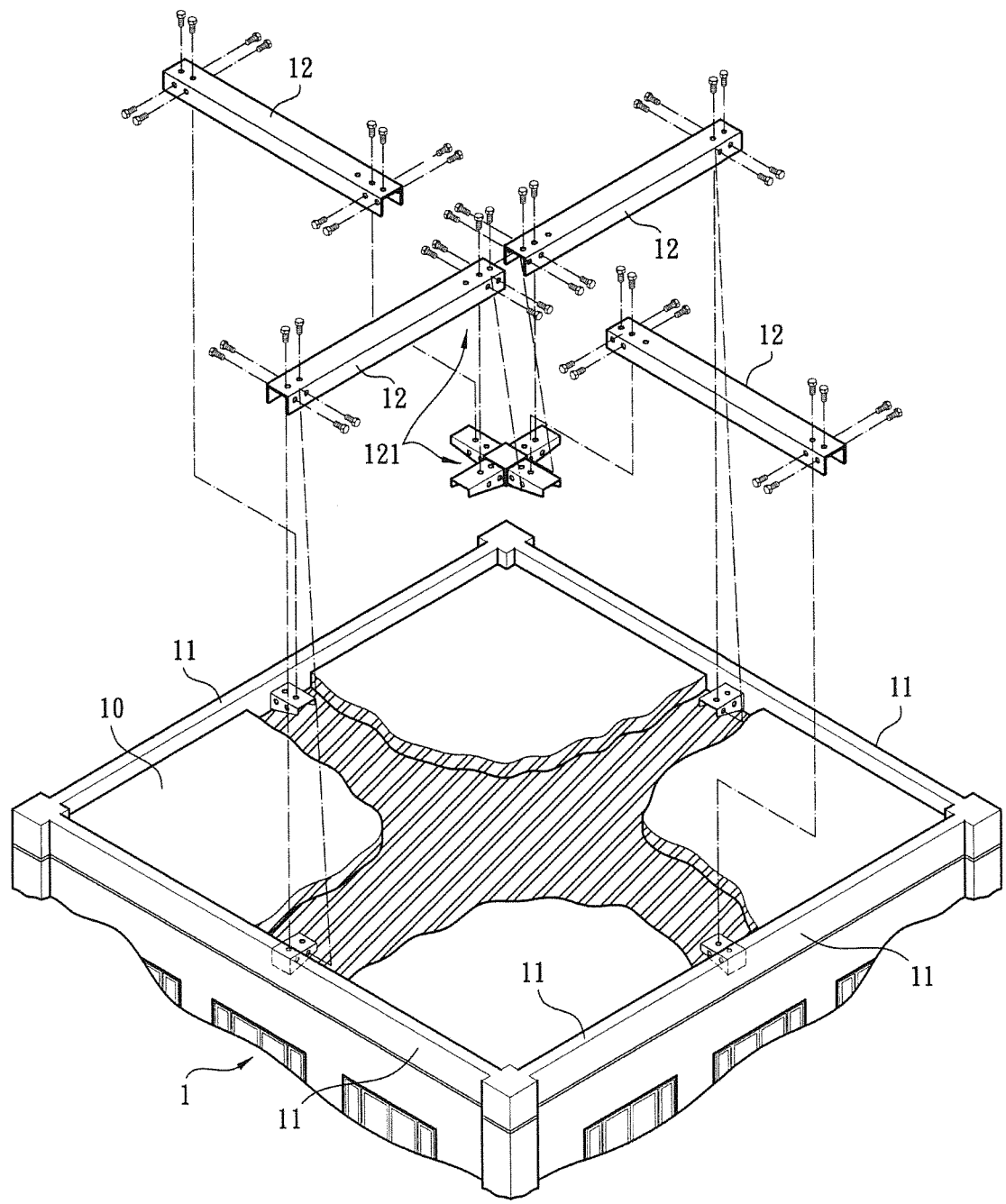
FIG. 1 is a perspective exploded view of a first embodiment of the building body of the present invention.
Figure 2:
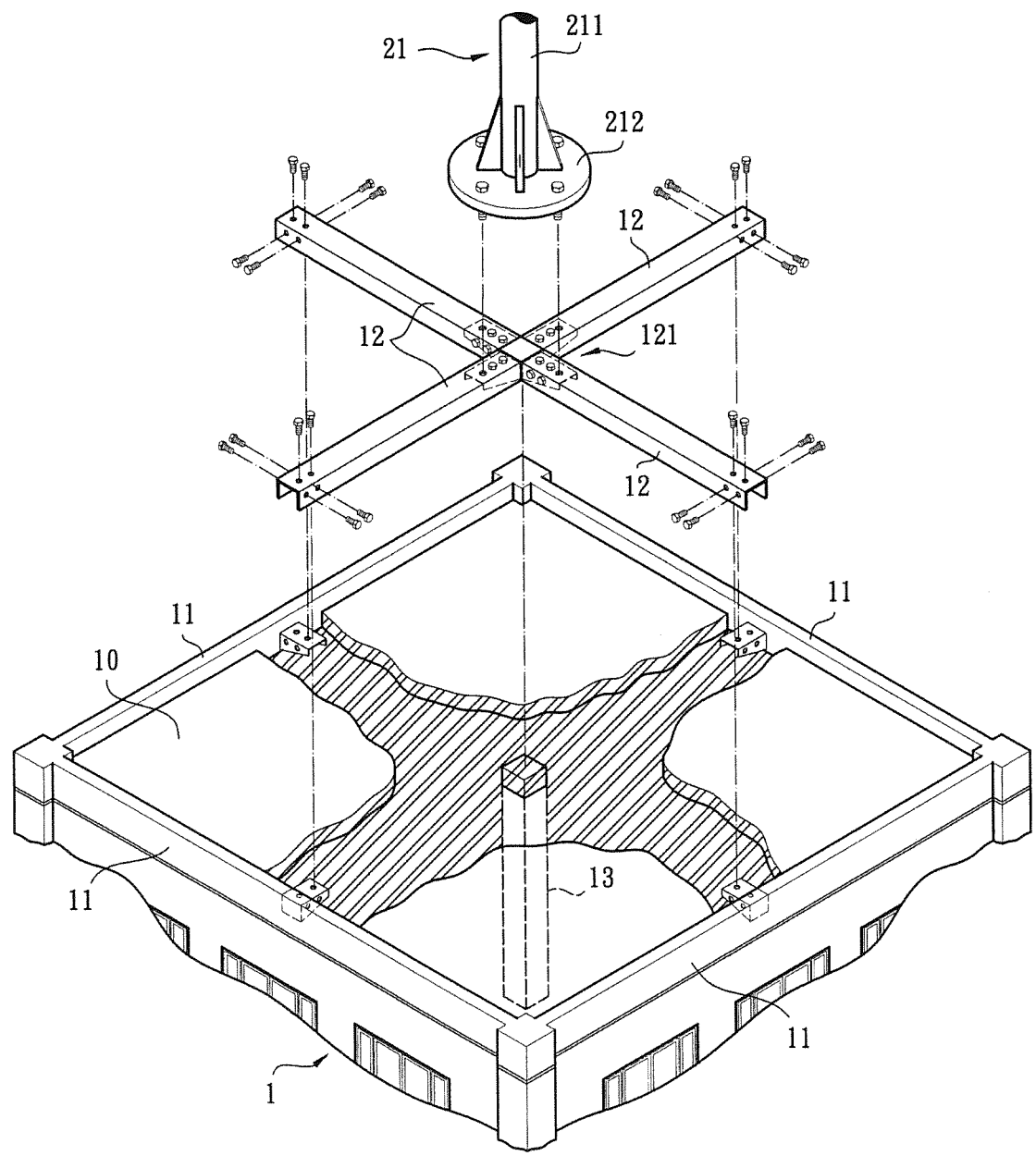
FIG. 2 is a perspective exploded view of the first embodiment of the building body of the present invention, showing a part of the solar tracking device.
Figure 3:
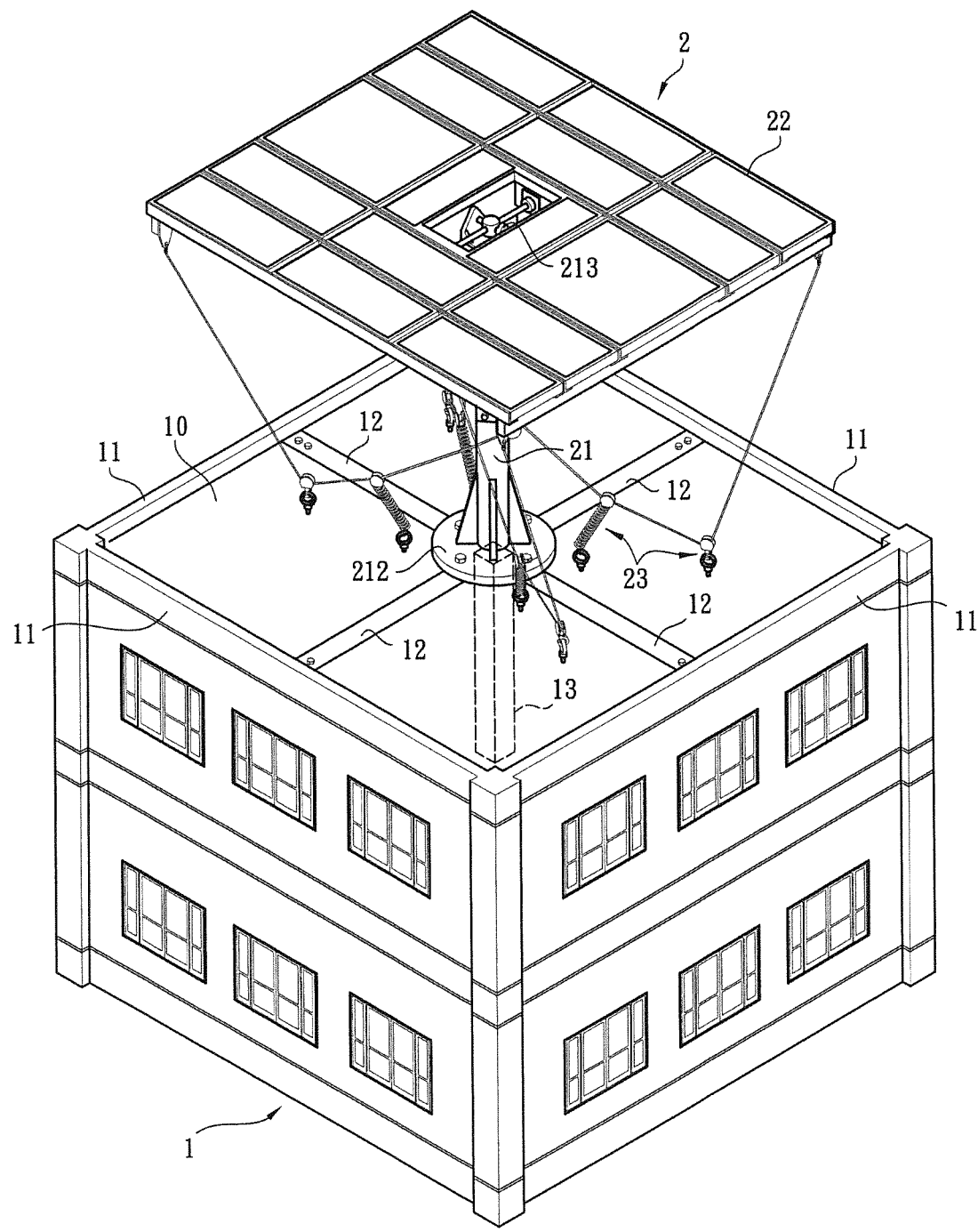
FIG. 3 is a perspective assembled view of the first embodiment of the building body of the present invention.

Please refer to FIGS. 1 to 3. The present invention includes a building body 1. A top tent (or a floorboard) 10 is positioned on upper side of the building body 1. The top tent 10 is supported by a peripheral structure 11 of the building body 1. A beam structure 12 is built on the peripheral structure 11 to inward extend to the top tent 10. The beam structure 12 is built with at least one set of intersection section 121 where the beams in different directions intersect each other. A solar tracking device 2 is composed of a support assembly 21, a solar generation module 22 and a link apparatus 23. The support assembly 21 is right mounted on the upper side of the intersection section 121 of the beam structure 12 or on the top tent (or the floorboard) 10 corresponding to the upper side of the intersection section 121. That is, in practice, the support assembly 21 can be directly mounted on the upper side of the intersection section 121 of the beam structure 12. Alternatively, the support assembly 21 can be supported and fixed on the surface of the top tent (or the floorboard) 10 corresponding to the upper side of the intersection section 121. Under such circumstance, the major weight of the solar tracking device 2 is uniformly distributed over every part of the top tent (or the floorboard) 10 and the peripheral structure 11 via the intersection section 121 and the beam structure 12. Accordingly, the stress caused by the weight will not concentrate on a specific part of the top tent (or the floorboard) 10, where the solar tracking device 2 is mounted to lead to damage. In addition, in order to reinforce the structure of the intersection section 121, a vertical column 13 or an equivalent support member can be directly additionally disposed between the lower side of the intersection section 121 and a next lower floor (floorboard or the ground) of the building body 1 corresponding to the intersection section 121, so as to increase the support force of the intersection section 121.

Accordingly, the top tent (or the floorboard) 10 and the cooperative beam structure 12 and peripheral structure 11 and/or the vertical column 13 are assembled to together define a region above the next lower floorboard or the ground as a safe and utilizable space. The space can serve as a common house or other closed or not closed space (such as a farmhouse). Under such circumstance, the space or ground under the solar tracking device will not be idled and wasted as the conventional device.

Figure 4:
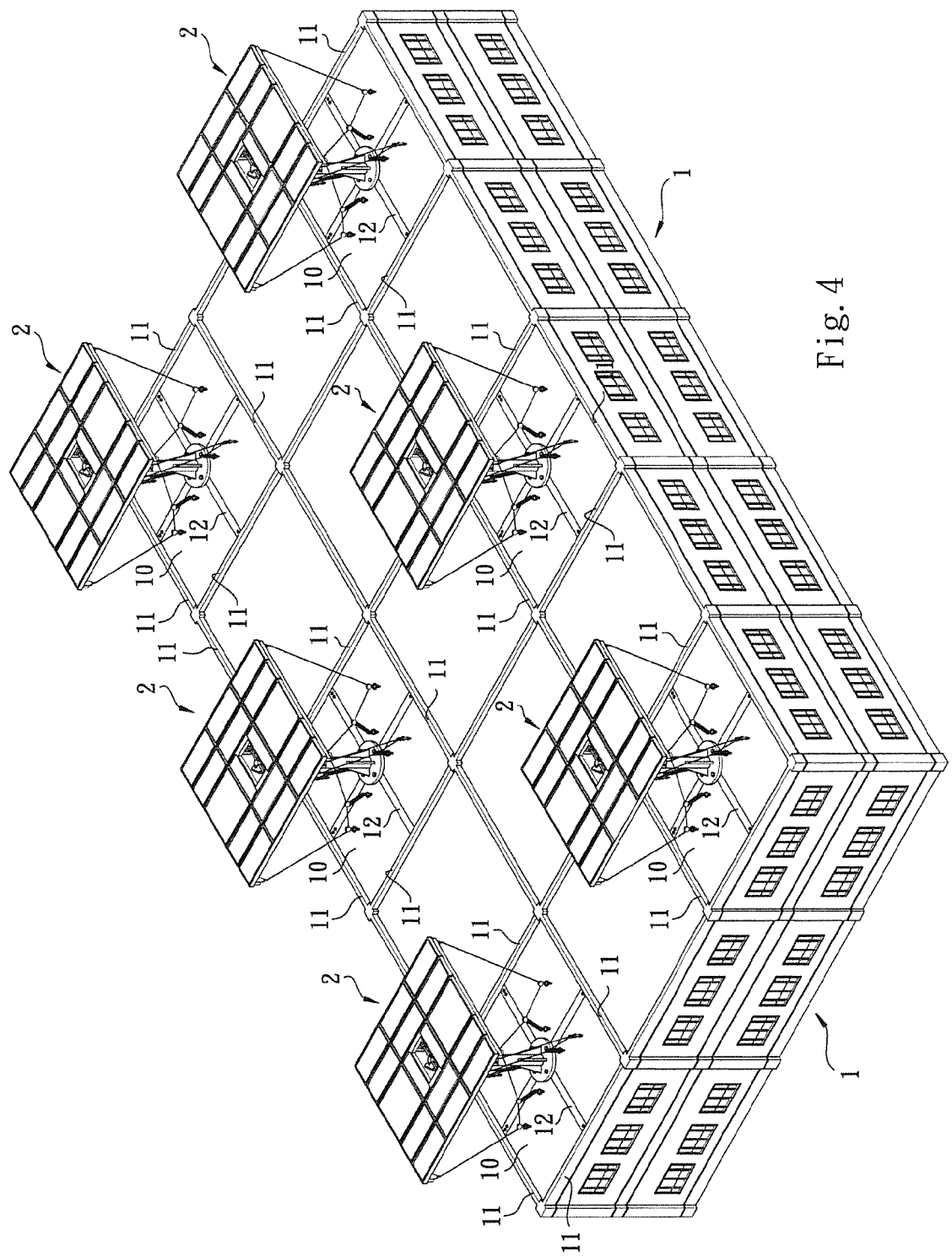
FIG. 4 is a perspective assembled view of the first embodiment of the building body of the present invention, showing that multiple solar tracking devices are arranged on one single building body.
Figure 5:
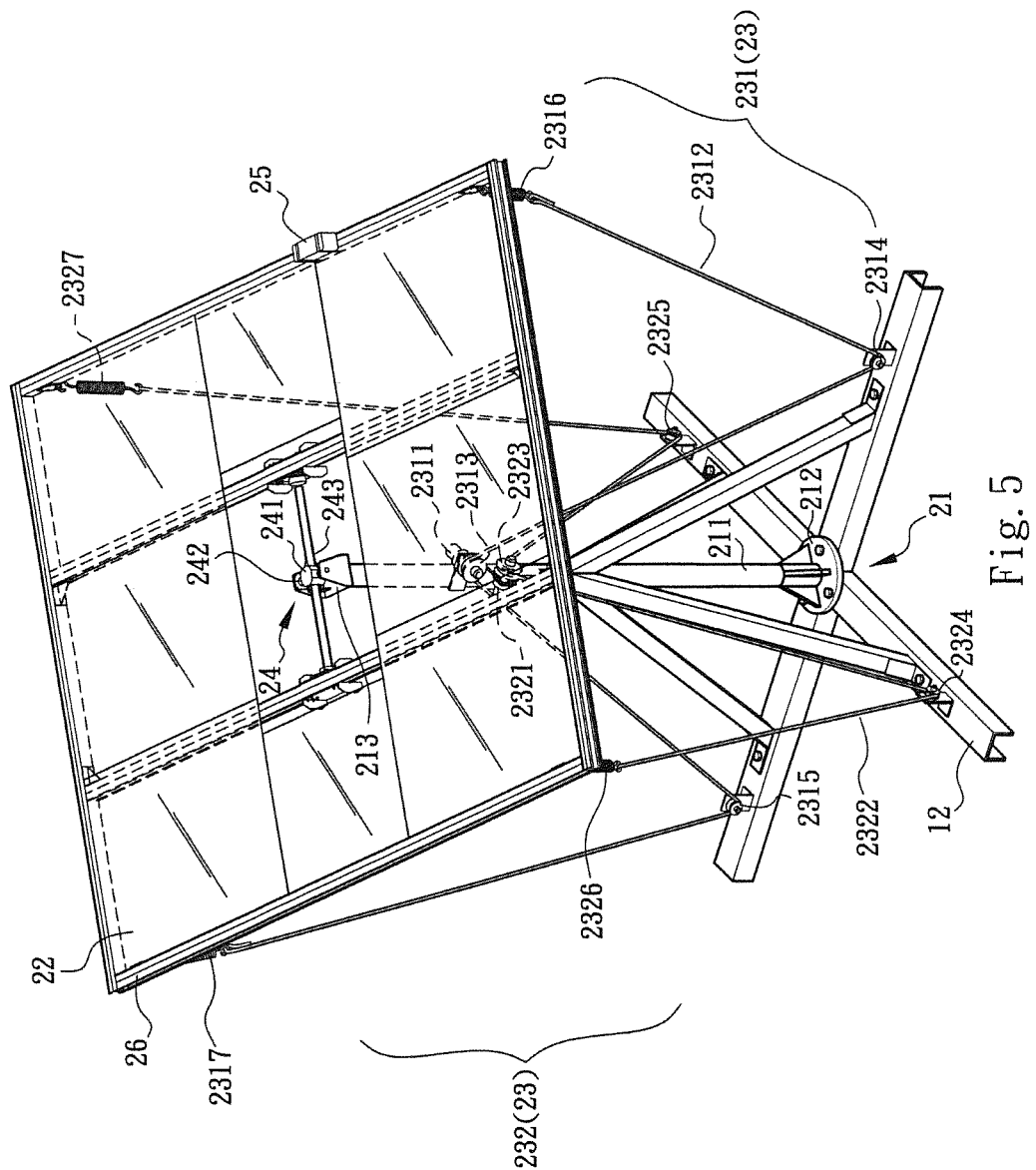
FIG. 5 is a perspective view of the solar tracking device of the present invention.
Figure 6:
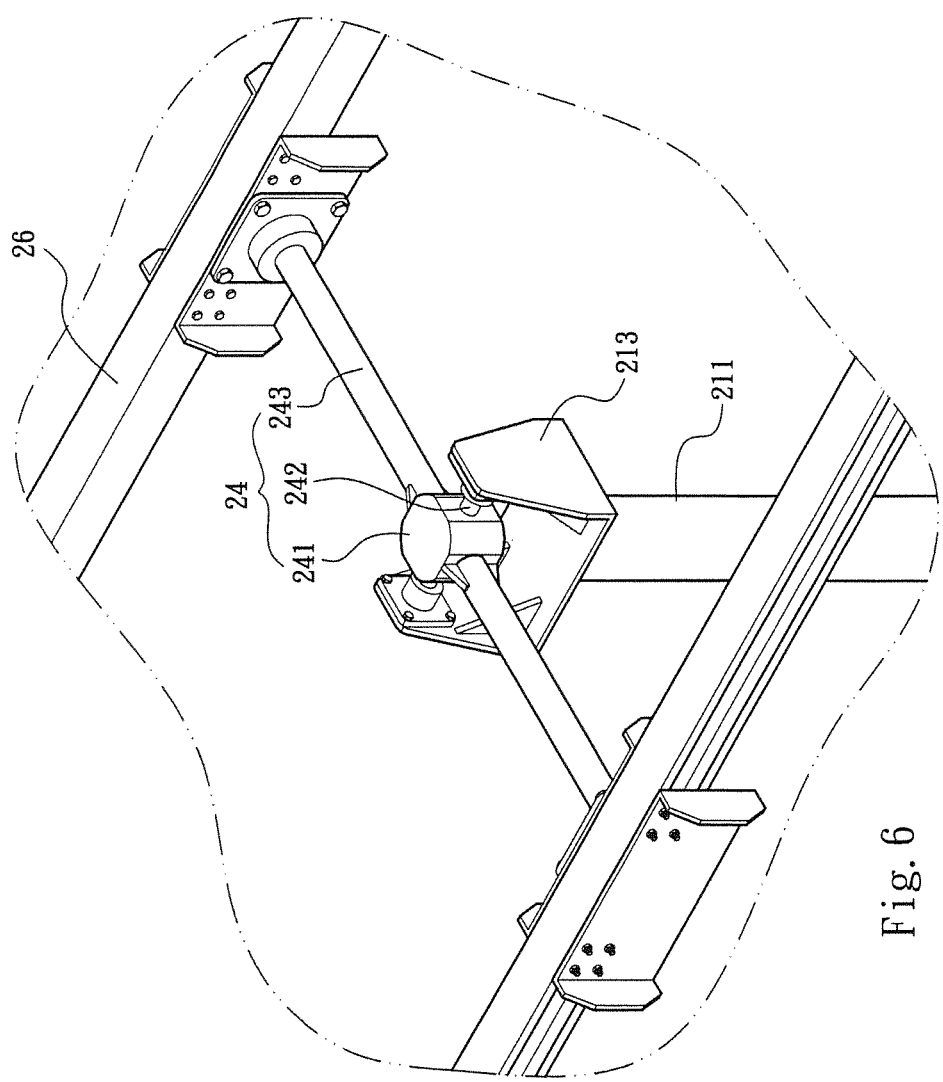
FIG. 6 is an enlarged view of the pivot seat and the relevant components according to FIG. 5.

Please now refer to FIG. 4. In order to enhance the utility of the present invention, the solar tracking device 2 is assembled with the building body 1 in such a form that the beam structure 12 is integrally distributed and built on the top tent (or the floorboard) 10 of one single building body 1 to have several intersection sections 121. Multiple solar tracking devices 2 are respectively mounted on the upper sides of at least multiple intersection sections 121 or arranged in positions corresponding to the upper sides of the intersection sections 121. In this case, the total solar energy collection performance can be enhanced to widen the application range.

Moreover, in order to facilitate the installation of the solar tracking devices 2, the solar tracking device 2 of the present invention are mounted on the intersection sections 121 of the building body 1 as adjacent to the peripheral structure 11 as possible. In this case, a high-load crane machine (such as a self-propelled crane) can be used to help in craning the solar tracking devices 2 so as to reduce the difficulty in assembling the solar tracking devices 2 on the floorboard.

According to the above arrangement, as shown in FIGS. 5 to 8, the real structure of the solar tracking device 2 of the present invention includes a support assembly 21, a solar generation module 22 and at least one link apparatus 23 for driving the solar generation module 22. In the drawings, the link apparatus 23 includes a first link unit 231, a second link unit 232, a pivot assembly 24 and a detection/correction module 25. The support assembly 21 has a support column 211 and a base seat 212 outward extending from one end of the support column 211 for mounting on the upper side of the intersection section 121 or on the top tent (or the floorboard) 10 corresponding to the upper side of the intersection section 121 as a secure support. In addition, a support seat 213 is disposed at the other end of the support column 211 opposite to the base seat 212.

The pivot assembly 24 is composed of a pivot seat 241, a first shaft rod 242 and a second shaft rod 243. The first and second shaft rods 242, 243 pass through the pivot seat 241 and intersect each other. The first shaft rod 242 is fixed on the pivot seat 241. Two ends of the first shaft rod 242 are pivotally connected with the support seat 213. (In practice, alternatively, two ends of the first shaft rod 242 can be fixed on the support seat 213 and the middle section of the first shaft rod 242 can be pivotally connected in the pivot seat 241). Accordingly, the pivot seat 241 is two-dimensionally rotatable around the first shaft rod 242 relative to the support seat 213. The second shaft rod 243 is also fixed on the pivot seat 241. Two ends of the second shaft rod 243 are pivotally connected with a carrier platform 26. (In practice, alternatively, two ends of the second shaft rod 243 can be fixed on the carrier platform 26 and the middle section of the second shaft rod 243 can be pivotally connected in the pivot seat 241). Accordingly, the carrier platform 26 is two-dimensionally rotatable around the second shaft rod 243 relative to the support seat 213. According to the actual requirements, the area of the solar generation module 22 or the carrier platform 26 can be designed to be smaller than (FIG. 3) or larger than (FIG. 13) the range of the top tent 10 of the building body 1 to achieve best economic benefit.

The solar generation module 22 is disposed on the carrier platform 26 to absorb sunlight and generate power.

The first link unit 231 and the second link unit 232 are respectively disposed between the support assembly 21 and the carrier platform 26. In this embodiment, the first link unit 231 at least includes a first power source 2311 (such as a motor) and a flexible connection member 2312 (such as a steel cable). The first power source 2311 (motor) is drivingly connected with the connection member 2312 (steel cable) via a first drive member 2313 (such as a drive wheel). Two ends of the connection member 2312 (steel cable) are connected to two opposite corners of the carrier platform 26. In this embodiment, the carrier platform 26 has a polygonal (quadrangular) shape. The first power source 2311 is disposed at the middle of the support column 211. In addition, two idling members 2314, 2315 (such as two idlers) are disposed on the base seat 212 of the support assembly 21. The connection member 2312 (steel cable) can pass through the two idling members 2314, 2315 to form a W-shaped bend. The two ends of the connection member 2312 (steel cable) can be respectively serially connected with two elastic members 2316, 2317 and then connected to the opposite corners of the carrier platform 26.

The second link unit 232 at least includes a second power source 2321 (such as a motor) and a connection member 2322 (such as a steel cable). The second power source 2321 (motor) is drivingly connected with the connection member 2322 (steel cable) via a second drive member 2323 (such as a drive wheel). Two ends of the connection member 2322 (steel cable) are connected to the other two opposite corners of the carrier platform 26. In this embodiment, the carrier platform 26 has a polygonal (quadrangular) shape. The second power source 2321 is disposed at the middle of the support column 211. In addition, two idling members 2324, 2325 (such as two idlers) are disposed on the base seat 212 of the support assembly 21. The connection member 2322 (steel cable) can pass through the two idling members 2324, 2325 to form a W-shaped bend. The two ends of the connection member 2322 (steel cable) can be respectively serially connected with two elastic members 2326, 2327 and then connected to the opposite corners of the carrier platform 26.

The detection/correction module 25 is disposed on the carrier platform 26, including at least one accelerometer and a control unit inside. The accelerometer serves to detect various practical parameters such as inclination direction and angle of the position where the accelerometer is positioned. The accelerometer can further transmit the practical parameters to the control unit. The control unit stores various preset reference parameters for comparing the practical parameters with the reference parameters. According to the comparison result, the control unit corrects the output of the first and second power sources 2311, 2321.

In practice, alternatively, the control unit can be disposed outside the detection/correction module 25, for example, on the base seat 212 of the support assembly 21 and received in a receptacle as necessary.

Figure 7:
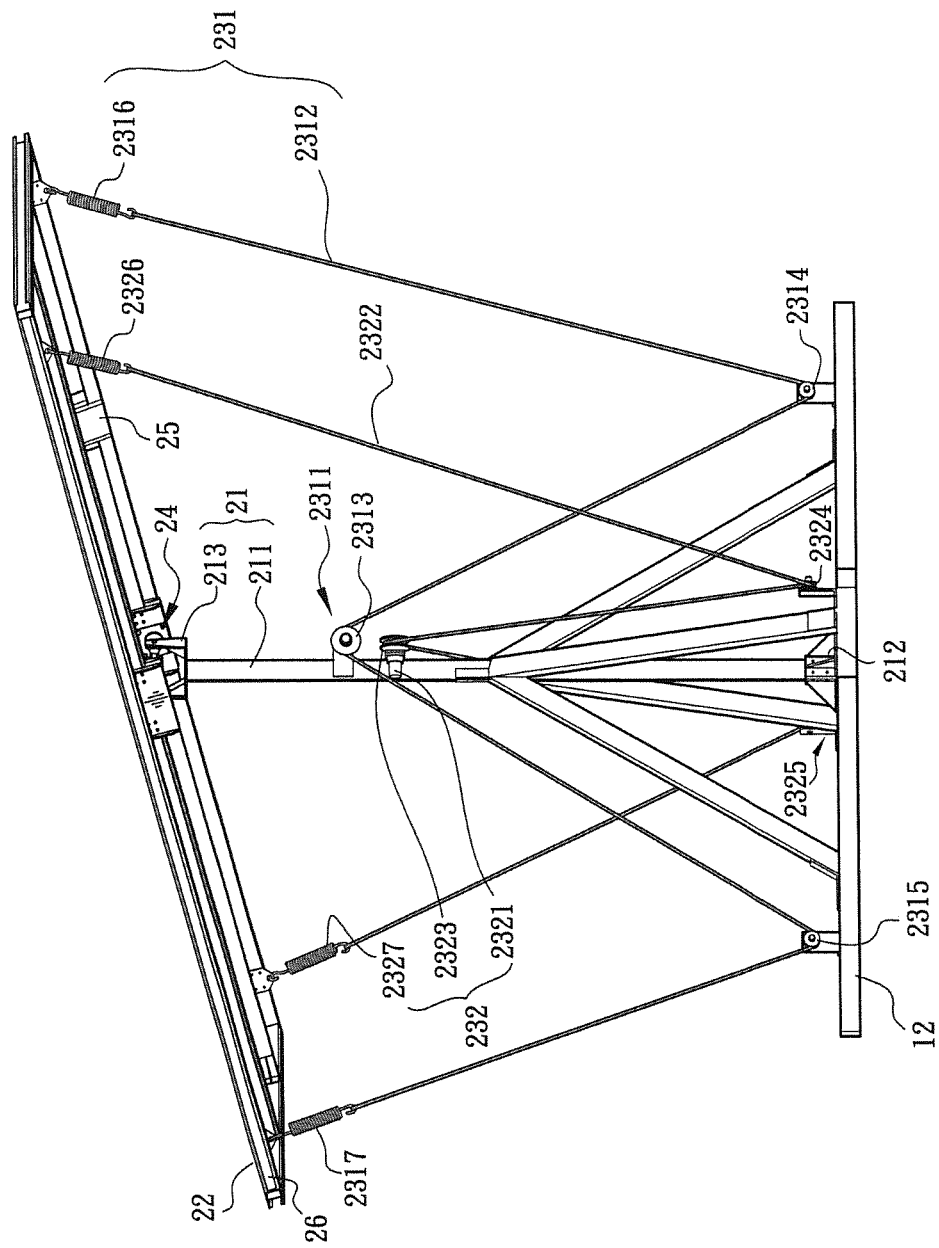
FIG. 7 is a perspective view showing that the solar tracking device of FIG. 5 is operated to a first position.
Figure 8:
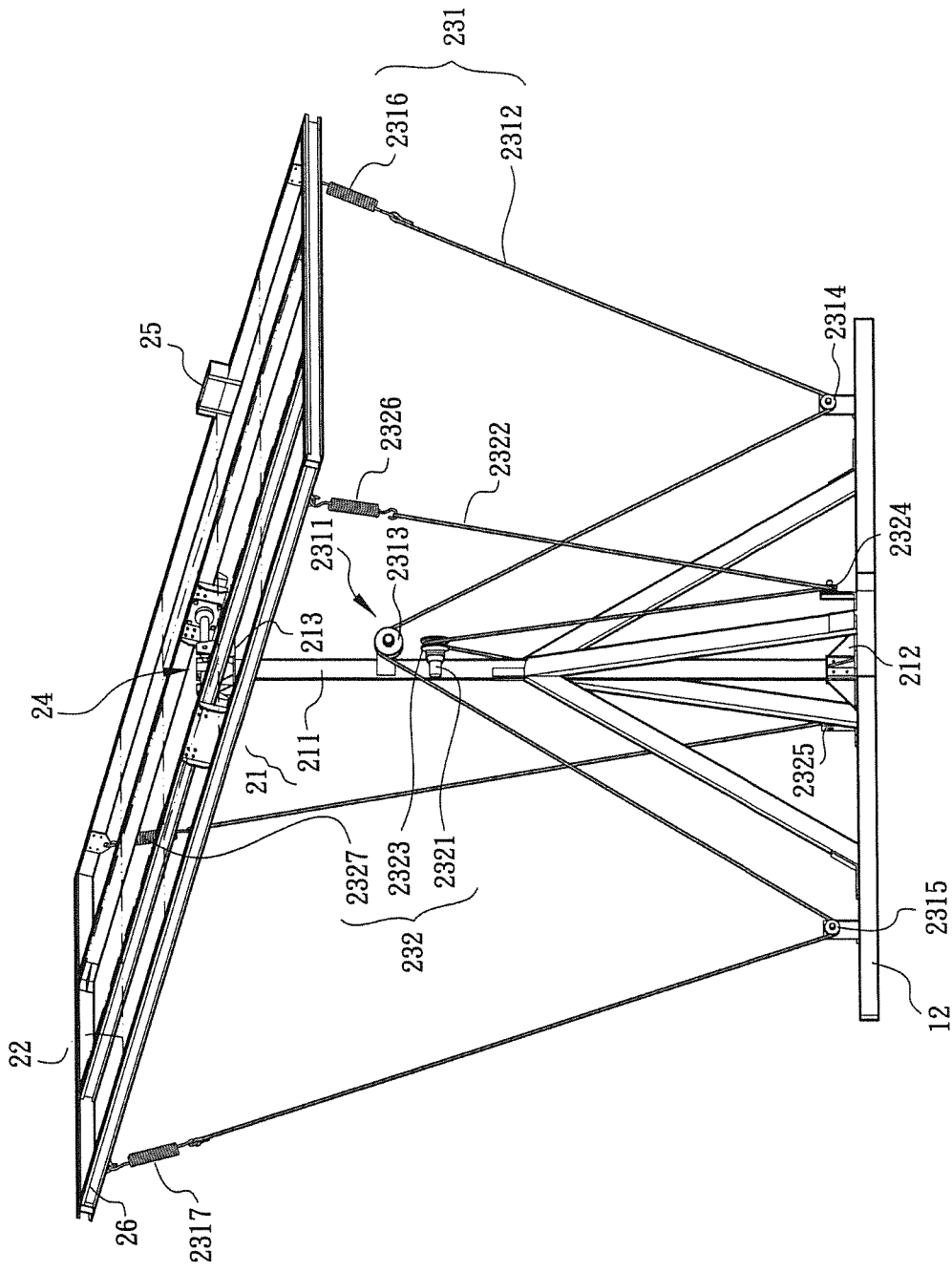
FIG. 8 is a perspective view showing that the solar tracking device of FIG. 5 is operated to a second position.

Please refer to FIGS. 7 and 8. In operation of the solar tracking device of the present invention, according to the various parameters stored in the control unit of the detection/correction module 25, the control unit respectively drives the first and second power sources 2311, 2321 (motors) of the first and second link units 231, 232 to operate. The first and second power sources 2311, 2321 (motors) respectively drive the connection members 2312, 2322 (steel cables) via the first and second drive members 2313, 2323 (drive wheels) so as to drive the carrier platform 26 to pivotally incline around the pivot assembly in a preset direction.

During the pivotal inclination of the carrier platform 26, the accelerometer in the detection/correction module 25 is inclined with the carrier platform 26. At this time, the accelerometer can detect various practical parameters such as inclination direction and angle of the carrier platform 26 and transmit the practical parameters to the control unit. The control unit compares the practical parameters with the preset reference parameters stored in the control unit. Then, according to the comparison result, the control unit corrects the output of the first and second power sources 2311, 2321, whereby the inclination direction and angle of the carrier platform 26 can meet the various preset parameters stored in the control unit. Accordingly, the solar generation module 22 disposed on the carrier platform 26 can be inclined in an inclination direction and angle according to the set parameters to keep facing the sun. In this case, a best sunshine effect can be achieved to provide highest power generation efficiency.

Figure 9:
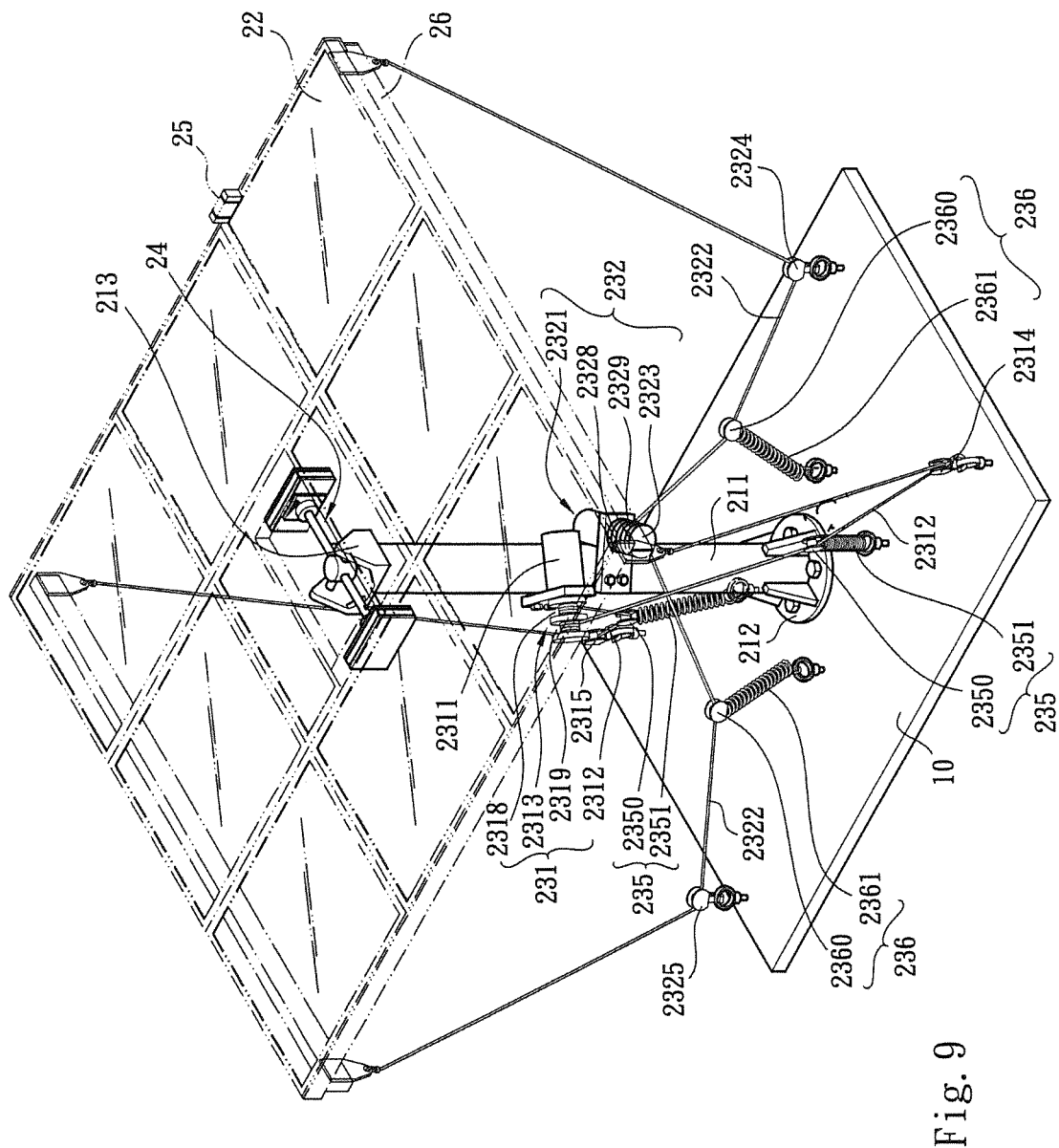
FIG. 9 is a perspective view of a second embodiment of the present invention.
Figure 10:
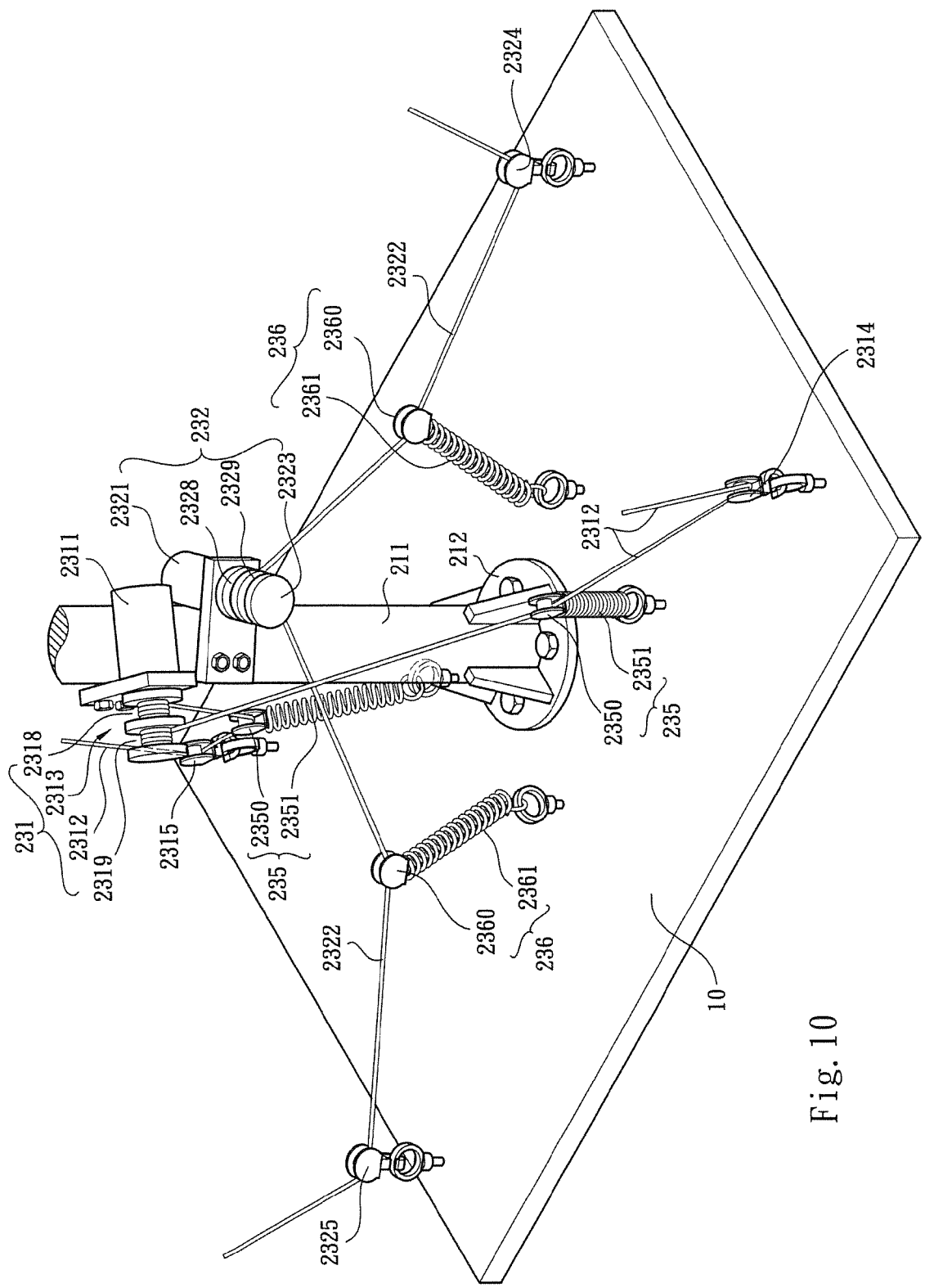
FIG. 10 is a perspective view according to FIG. 9, showing the first and second link units and the relevant components.
Figure 11:
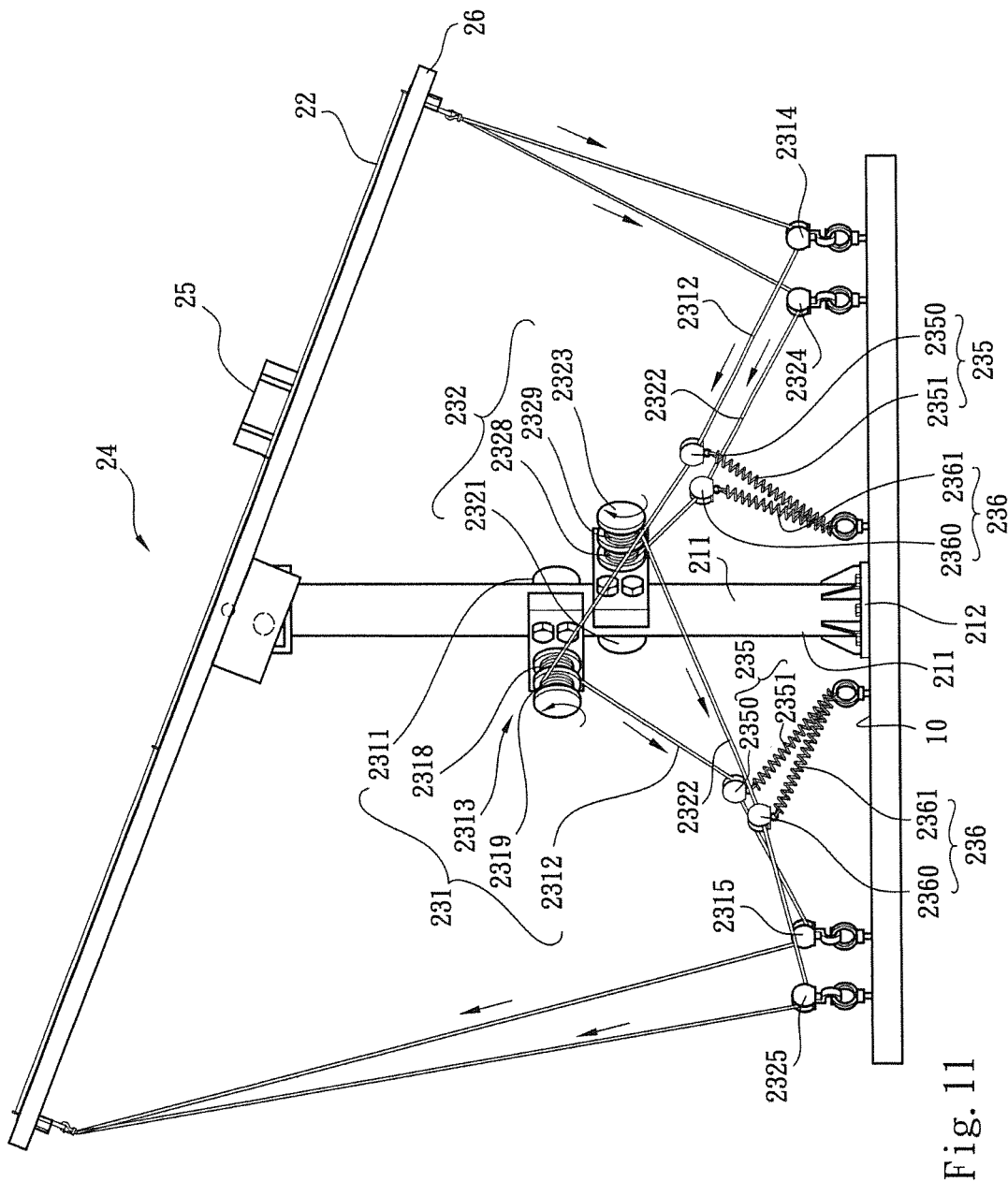
FIG. 11 is a side view according to FIG. 9, showing the operation of the present invention.

Please now refer to FIGS. 9 to 11. According to a second embodiment, the present invention includes a first link unit 231 and a second link unit 232 and a support assembly 21, a solar generation module 22, a pivot assembly 24 and a detection/correction module 25 identical to that of the first embodiment. The first and second link units 231, 232 are respectively composed of a first power source 2311 and a second power source 2321, a first drive member 2313 and a second drive member 2323 drivable by the first and second power sources 2311, 2321 and multiple connection members 2312, 2322.

The second embodiment is different from the first embodiment in that a first drive section 2318 and a second drive section 2319 are synchronously operably disposed on the first drive member 2313 and a third drive section 2328 and a fourth drive section 2329 are synchronously operably disposed on the second drive member 2323. In this embodiment, the first and second power sources 2311, 2321 are motors, while the first and second drive members 2313, 2323 are drive wheels disposed on the output shafts of the motors. The first and second drive sections 2318, 2319 are two adjacent annular grooves disposed on the first drive member 2313 (drive wheel). Two connection members 2312 are respectively drivingly wound on the first and second drive sections 2318, 2319 (annular grooves) in reverse directions. The third and fourth drive sections 2328, 2329 are two adjacent annular grooves disposed on the second drive member 2323 (drive wheel). Two connection members 2322 are respectively drivingly wound on the third and fourth drive sections 2328, 2329 (annular grooves) in reverse directions. The middle section of each connection member 2312, 2322 is first conducted through an idling member 2314, 2315, 2324, 2325 (the idling member can be a roller located on the top tent (or the floorboard) 10 or the beam structure 12) and then the other end of each connection member 2312, 2322 is respectively connected to the opposite corners of the carrier platform 26 corresponding to two sides of the support assembly 21. In practice, the middle section of each connection member 2312, 2322 can be further connected with an elastic adjustment assembly 235, 236. The elastic adjustment assembly 235, 236 serves to apply elastic pulling force to the middle section of each connection member 2312, 2322 so as to keep the connection member 2312, 2322 properly tensioned.

In the above structure, the elastic adjustment assemblies 235, 236 have identical structures. Each of the elastic adjustment assembly 235, 236 includes an elastic member 2351, 2361 (such as a spring). A fitting member 2350, 2360 (such as a roller) is disposed at one end of the elastic member 2351, 2361. The connection member 2312, 2322 is conducted through the fitting member 2350, 2360. The other end of the elastic member 2351, 2361 is connected to the top tent (or the floorboard) 10 or the beam structure 12. The elastic member 2351, 2361 serves to elastically pull the connection member 2312, 2322 to keep the connection member 2312, 2322 properly tensioned.

As aforesaid, the two connection members 2312, 2322 are respectively wound on the first and second drive sections 2318, 2319 (annular grooves) in reverse directions. Accordingly, in operation, when the first power source 2311 of the first link unit 231 drives the first drive member 2313 to rotate, in the case that the first drive section 2318 forwardly drives one connection member 2312 and winds the same, then the second drive section 2319 synchronously backwardly drives the other connection member 2312 and unwinds the same. Accordingly, the two reverse connection members 2312 are synchronously extended in the same direction, and vice versa. Therefore, the drive members 2313, 2323 can respectively drive the connection members 2312, 2322 to extend in the same direction. In this case, the connection members can be securely drivingly connected with the drive members to avoid slippage during the driving process and ensure precise operation. The link apparatus 23 operates in the same manner, whereby the solar generation module 22 (the carrier platform 26) can be stably inclined in a predetermined direction.

Figure 12:
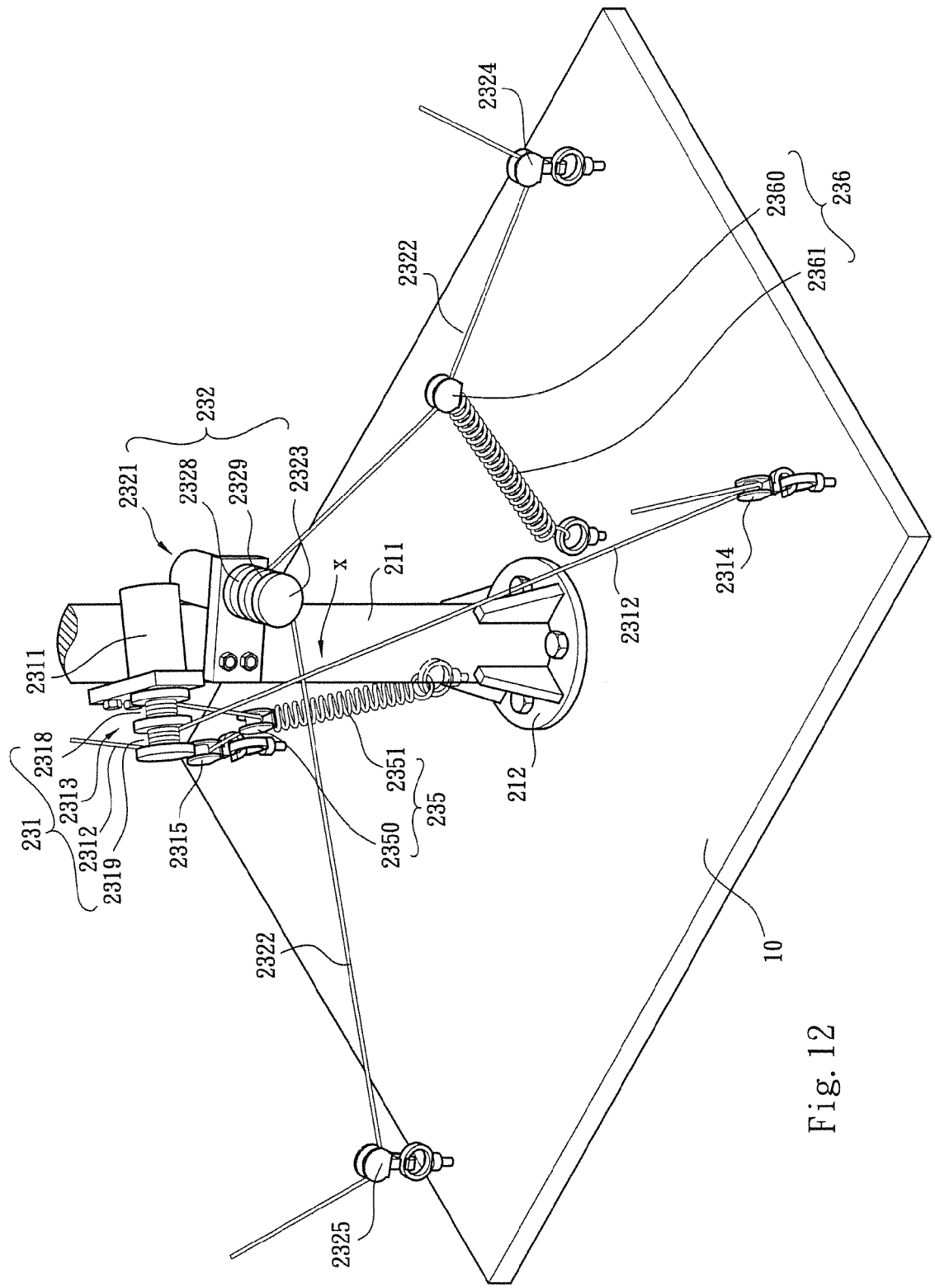
FIG. 12 is a perspective view of a third embodiment of the present invention, showing the first and second link units and the relevant components.

Please now refer to FIG. 12. According to the above arrangement, the extending paths of the connection members connected with different link units will up and down intersect each other in some positions, (for example, in the position X as shown in the drawing). In order to prevent the intersecting parts from touching and interfering with each other in operation, one of the intersecting connection members can be free from the elastic adjustment assembly so as to enlarge the height difference between the connection members. Under such circumstance, the connection members are prevented from deflecting to touch and interfere with each other in operation.

Figure 13:
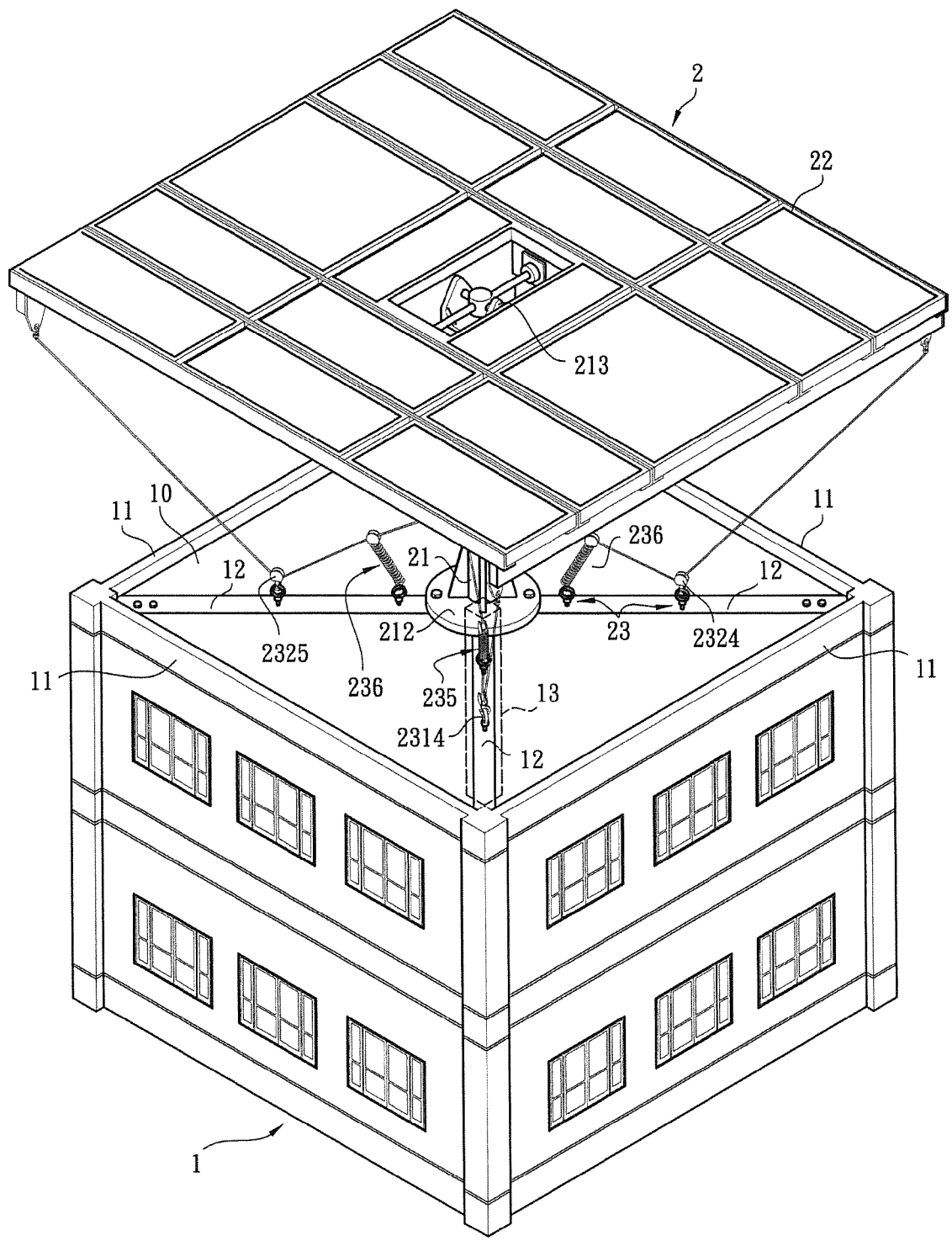
FIG. 13 is a perspective assembled view of the building body of the present invention in another form.

Please further refer to FIG. 13. According to the above arrangement, the idling members 2314, 2315, 2324, 2325 and the elastic adjustment assemblies 235, 236 of the link apparatus 23 can be directly fixed on the top tent (or the floorboard) 10 as shown in FIG. 3. Alternatively, these components can be respectively fixed on the beam structure 12 to simplify the working process and enhance the installation precision and integration of the structure.

Figure 14:
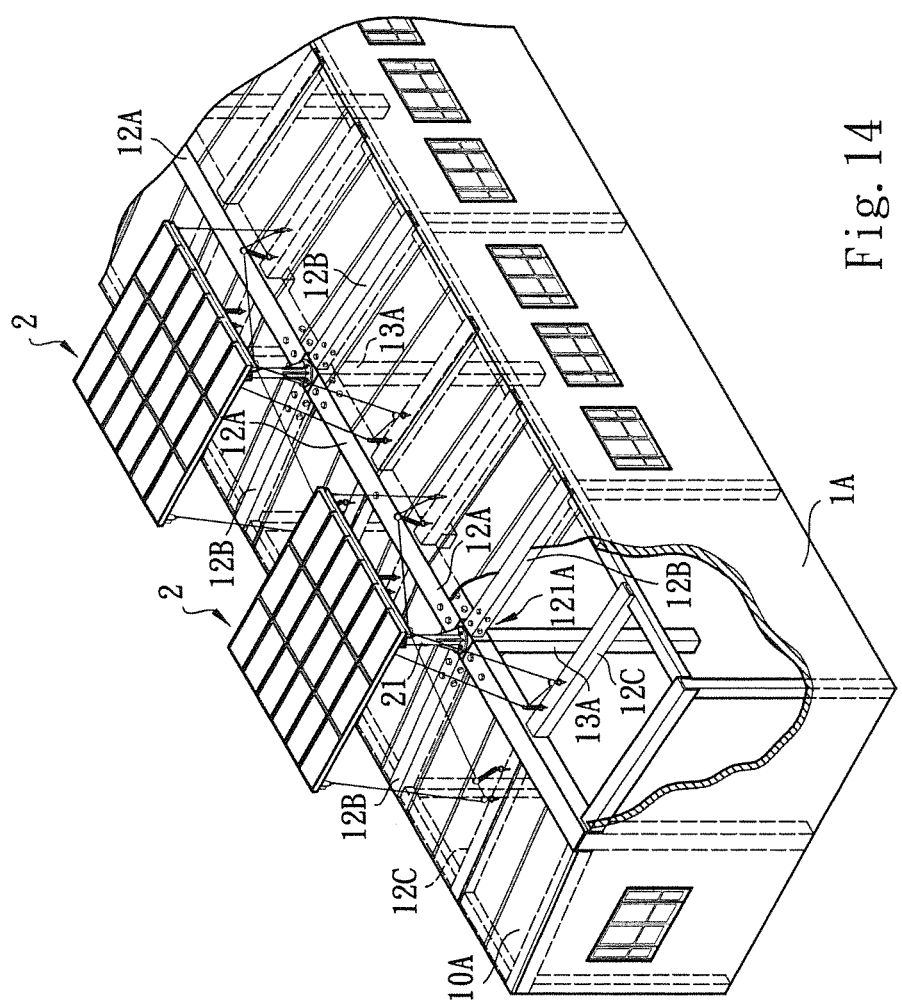
FIG. 14 is a perspective view showing that one row of solar tracking devices is arranged on an inclined top tent of the building body of the present invention.
Figure 15:
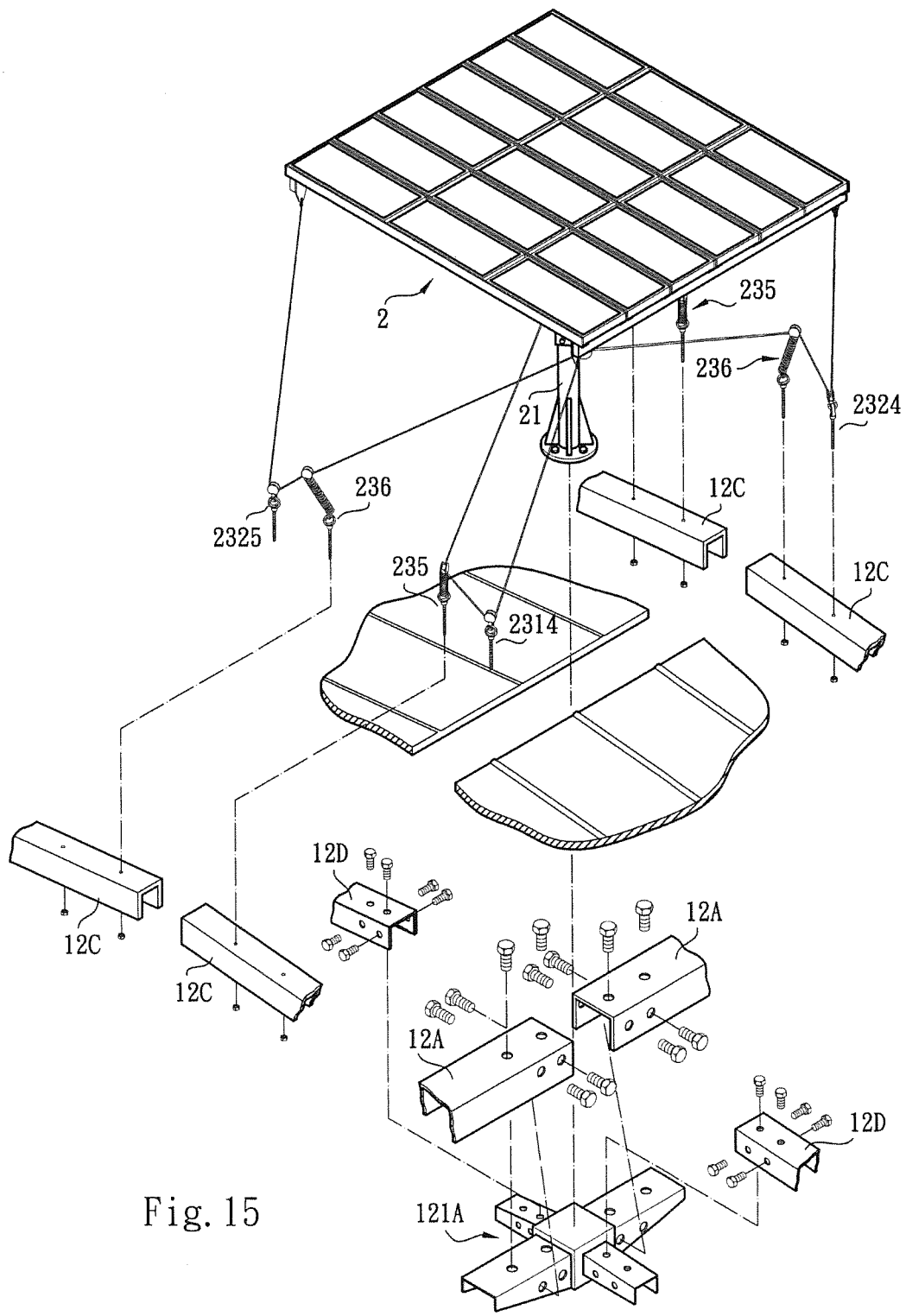
FIG. 15 is a perspective partially exploded view of the embodiment of FIG. 14.

Please now refer to FIGS. 14 and 15, which show a building body 1A with an inclined top tent (inclined roof) 10A. The building body 1A has a main beam structure 12A at a ridge section of the inclined top tent 10A. The main beam structure 12A has at least one intersection section 121A. Subsidiary beams 12B are laterally obliquely connected to at least one side of the intersection section 121A. The subsidiary beam structure 12B can extend to the peripheral structure 11A of the building body 1A along the inclined top tent 10A. A vertical column 13A can be disposed right under the intersection section 121A to increase the support force of the intersection section 121A. The solar tracking device 2 is arranged on the intersection section 121A. The idling members 2314, 2315, 2324, 2325 and the elastic adjustment assemblies 235, 236 can be directly fixed on the inclined top tent 10A. Alternatively, these components can be mounted on the main beam structure 12A and auxiliary beam structures 12C extending from two sides of the main beam structure 12A and misaligned from the intersection section.

Figure 16:
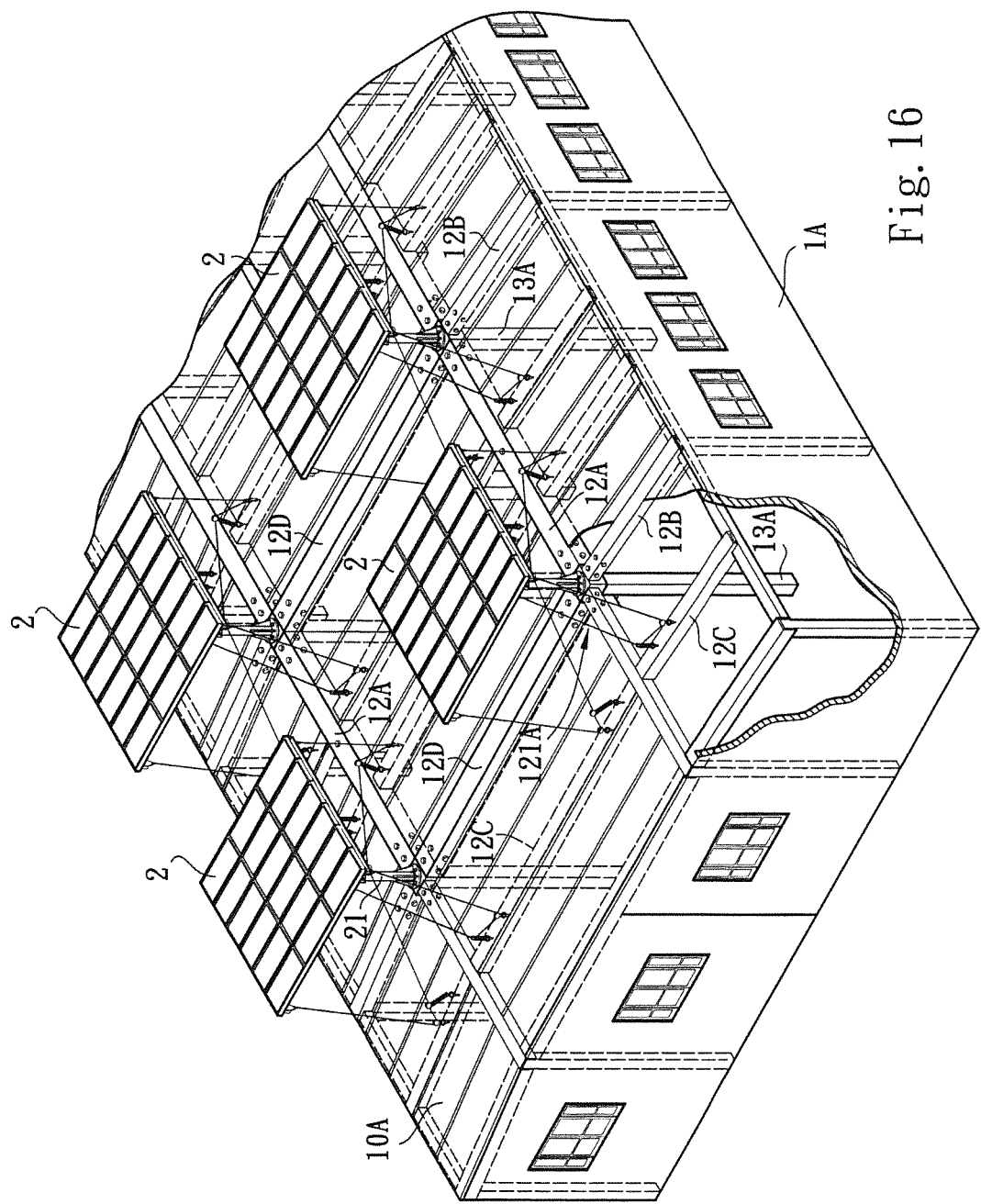
FIG. 16 is a perspective view showing that two (multiple) rows of solar tracking devices are arranged on an inclined top tent of the building body of the present invention.
Figure 17:
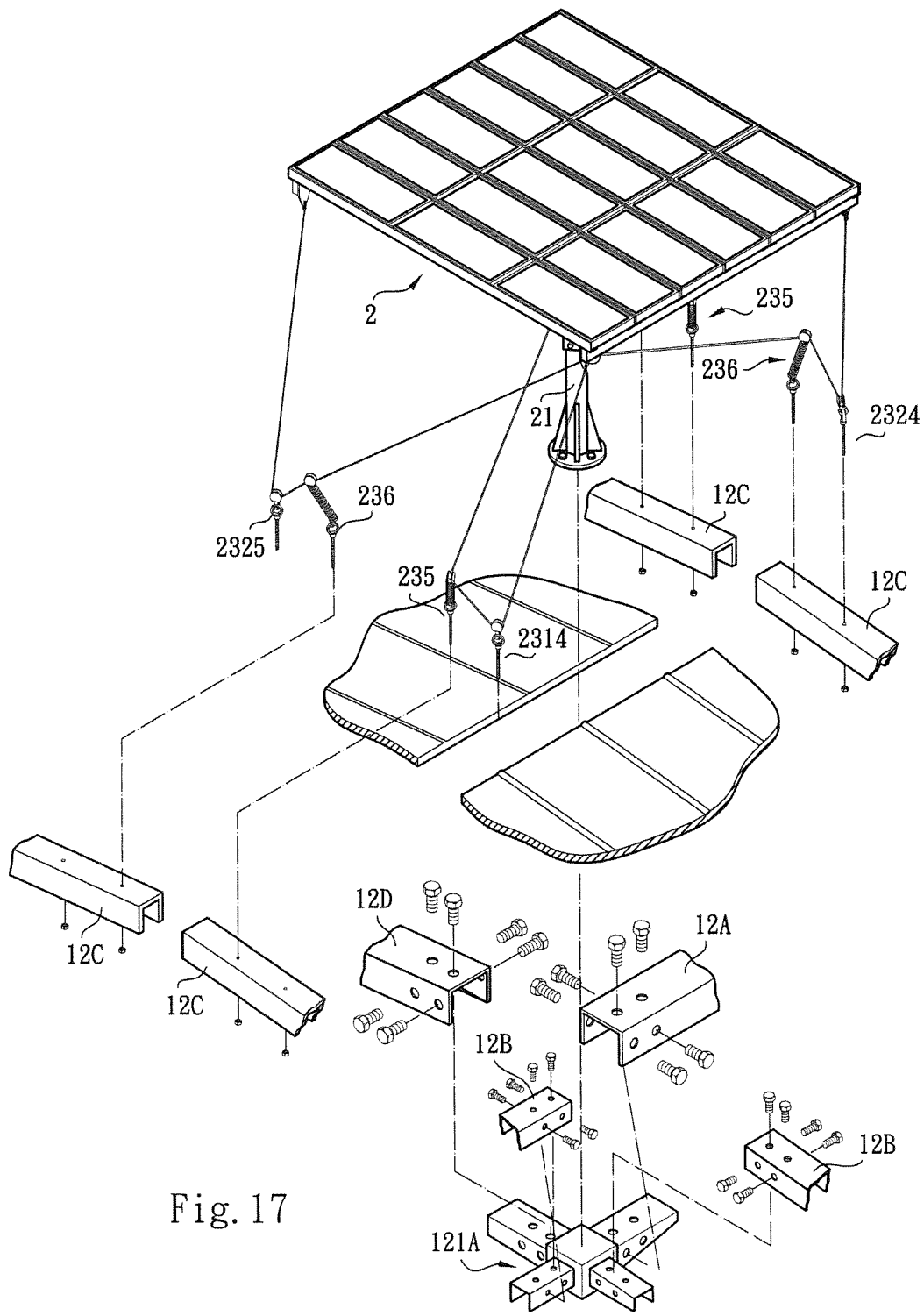
FIG. 17 is a perspective partially exploded view of the embodiment of FIG. 16.

FIGS. 16 and 17 show another embodiment of the present invention, which has a structure based on that of FIGS. 14 and 15. In this embodiment, the extension-type building body 1A has at least two adjacent rows of main beam structures 12A. Parallel main beam structures 12D are further connected between the adjacent intersection sections 121A of the adjacent rows of main beam structures 12A. Accordingly, a square main beam structure unit is defined between each four intersection sections of the beams in four directions. The beam structure of the elongated building body extends in the longitudinal direction of the main beam structure unit.

Moreover, in order to save the material cost of the building body 1A, in practice, the materials of the main beam structure 12A and the parallel main beam structure 12D can selectively have a sufficiently large size, while the materials of the subsidiary beam structure 12B and the auxiliary beam structure 12C can selectively have a smaller size than the main beam structure 12A and the parallel main beam structure 12D. This is practical and economic.

In conclusion, the building body with solar tracking device of the present invention is novel and advanced.

The above embodiments are only used to illustrate the present invention, not intended to limit the scope thereof. Many modifications of the above embodiments can be made without departing from the spirit of the present invention.

What is claimed is:
1. A building body with solar tracking device, comprising:
   a peripheral structure and a top tent supported on the peripheral structure;
   a beam structure being built on the peripheral structure and inwardly extending from the peripheral structure, the beam structure including at least one intersection section where multiple beams in different directions intersect each other;

a support assembly of the solar tracking device being mounted on an upper side of the at least one intersection section of the beam structure or in a position corresponding to the upper side of the at least one intersection section, the solar tracking device being supported by the support assembly and mounted on the top tent;

a utilizable space being formed under the assembly of the peripheral structure and the beam structure;

a support seat being disposed at one end of the support assembly;

a carrier platform disposed on the support seat via an at least two-dimensionally movable pivot assembly, at least one solar generation module being disposed on the carrier platform for absorbing sunlight to generate power; and at least one link apparatus disposed between the support assembly and the carrier platform, the at least one link apparatus driving the carrier platform to incline around the pivot assembly in different directions and angles according to reference parameters previously stored in a control unit, the at least one link apparatus being disposed between the support assembly and the carrier platform, the at least one link apparatus being composed of at least two link units, at least one of the two link units including at least one power source and a connection member drivable by the power source, the connection member being flexibly connected between two opposite sections of the carrier platform.

2. The building body with solar tracking device as claimed in claim 1, wherein the power source is connected to the connection member in two-segment form via a drive member, two synchronously operable drive sections being disposed on the drive member, first ends of the two segments of the two connection members being respectively connected to the two drive sections in reverse directions, while second ends of the two segments being respectively connected to two opposite corners of the carrier platform corresponding to two sides of the support assembly.

3. The building body with solar tracking device as claimed in claim 2, wherein the two drive sections are two annular grooves formed on the drive member respectively for the two segments of the connection members to wind thereon in reverse directions.

4. The building body with solar tracking device as claimed in claim 3, wherein a vertical column is disposed between the at least one intersection section under the support assembly and a next lower floorboard of the building body relative to the at least one intersection section.

5. The building body with solar tracking device as claimed in claim 2, wherein a vertical column is disposed between the at least one intersection section under the support assembly and a next lower floorboard of the building body relative to the intersection section.

6. The building body with solar tracking device as claimed in claim 1, wherein the beam structure of the top tent is formed with multiple intersection sections and multiple solar tracking devices are respectively mounted on the upper sides of the intersection sections or at least parts of the upper sides of the intersection sections.

7. The building body with solar tracking device as claimed in claim 6, wherein the intersection sections on which the solar tracking devices are mounted are arranged in adjacency to the peripheral structure.

8. The building body with solar tracking device as claimed in claim 7, wherein the beam structure is composed of at least two adjacent rows of main beam structures and parallel main beam structures are further connected between adjacent intersection sections of the adjacent rows of main beam structures.

9. The building body with solar tracking device as claimed in claim 6, wherein the support assembly at least has a support column, one end section of the support column being disposed and supported on an upper side of each intersection section of said multiple intersection sections.

10. The building body with solar tracking device as claimed in claim 6, wherein a vertical column is disposed between each of the intersection sections under each of the support assemblies and a next lower floorboard of the building body relative to each intersection section.

11. The building body with solar tracking device as claimed in claim 1, wherein the top tent has at least one higher ridge section and an inclined top tent is disposed on at least one side of the ridge section.

12. The building body with solar tracking device as claimed in claim 1, wherein the support assembly at least has a support column, one end section of the support column being disposed and supported on an upper side of the at least one intersection section.

13. The building body with solar tracking device as claimed in claim 1, wherein the beam structure is composed of at least two adjacent rows of main beam structures and parallel main beam structures are further connected between adjacent intersection sections of the adjacent rows of main beam structures.

14. The building body with solar tracking device as claimed in claim 13, wherein a vertical column is disposed between each of the intersection sections under each of the support assemblies and a next lower floorboard of the building body relative to each intersection section.

15. The building body with solar tracking device as claimed in claim 1, wherein a vertical column is disposed between the at least one intersection section under the support assembly and a next lower floorboard of the building body relative to the intersection section.

16. The building body with solar tracking device as claimed in claim 1, wherein each link unit includes at least one idling member and the connection member passes through an edge of the idling member to bend and extend in reverse direction, the connection member being connected to at least one elastic member.

17. The building body with solar tracking device as claimed in claim 1, wherein the at least one link apparatus is directly fixed on the top tent.

18. The building body with solar tracking device as claimed in claim 1, wherein the at least one link apparatus is fixed with the top tent by means of fixedly connecting the at least one link apparatus on the corresponding beam structure.

* * * * *